United States Patent
Bar-El

(10) Patent No.: US 8,201,260 B2
(45) Date of Patent: Jun. 12, 2012

(54) DEVICE, SYSTEM, AND METHOD OF DIGITAL RIGHTS MANAGEMENT UTILIZING SUPPLEMENTAL CONTENT

(75) Inventor: Hagai Bar-El, Rehovot (IL)

(73) Assignee: Discretix Technologies Ltd., Kfar Netter (IL)

( * ) Notice: Subject to any disclaimer, the term of this patent is extended or adjusted under 35 U.S.C. 154(b) by 893 days.

(21) Appl. No.: 12/178,660

(22) Filed: Jul. 24, 2008

(65) Prior Publication Data
US 2009/0031427 A1   Jan. 29, 2009

Related U.S. Application Data

(60) Provisional application No. 60/935,047, filed on Jul. 24, 2007.

(51) Int. Cl.
*H04L 29/06* (2006.01)
(52) U.S. Cl. .......................... 726/26; 380/201
(58) Field of Classification Search .................. None
See application file for complete search history.

(56) References Cited

U.S. PATENT DOCUMENTS

| | | | |
|---|---|---|---|
| 5,920,861 A | 7/1999 | Hall et al. | |
| 6,545,596 B1 | 4/2003 | Moon | |
| 6,889,054 B2 | 5/2005 | Himmel et al. | |
| 7,120,250 B2 | 10/2006 | Candelore | |
| 7,424,545 B2 * | 9/2008 | Ducheneaut et al. | 709/231 |
| 7,870,589 B2 * | 1/2011 | Ducheneaut et al. | 725/80 |
| 7,933,172 B2 * | 4/2011 | Gargi et al. | 369/30.09 |
| 2004/0003398 A1 | 1/2004 | Donian et al. | |
| 2005/0033700 A1 | 2/2005 | Vogler et al. | |
| 2005/0257242 A1 * | 11/2005 | Montgomery et al. | 725/116 |
| 2006/0075455 A1 | 4/2006 | Koch et al. | |
| 2006/0112343 A1 * | 5/2006 | Ducheneaut et al. | 715/758 |
| 2006/0112344 A1 * | 5/2006 | Ducheneaut et al. | 715/758 |
| 2006/0117391 A1 | 6/2006 | Kim | |
| 2006/0153533 A1 * | 7/2006 | Gargi et al. | 386/95 |
| 2006/0174263 A1 * | 8/2006 | Ducheneaut et al. | 725/32 |
| 2006/0174292 A1 * | 8/2006 | Ducheneaut et al. | 725/90 |
| 2006/0174313 A1 * | 8/2006 | Ducheneaut et al. | 725/135 |
| 2007/0098165 A1 | 5/2007 | Yoshikawa | |
| 2007/0162335 A1 | 7/2007 | Mekikian | |
| 2007/0294773 A1 | 12/2007 | Hydrie et al. | |

(Continued)

FOREIGN PATENT DOCUMENTS

GB     2 416 887     2/2006

(Continued)

OTHER PUBLICATIONS http://www.ericsson.com/au/ericsson/press/2007/20070222__mobile_tv.shtml, downloaded on Aug. 24, 2008.

(Continued)

*Primary Examiner* — Oscar Louie
(74) *Attorney, Agent, or Firm* — Eitan Mehulal Law Group

(57) ABSTRACT

Device, system, and method of digital-rights-management (DRM). In some embodiments, a device may include a DRM agent to manage the utilizing of a content object including secured digital content based on a rights object related to the content object, wherein based on at least one restriction defined in the rights object, the agent is to cause the device to present supplemental content of at least one supplemental content object when the content object is utilized. Other embodiments are described and claimed.

28 Claims, 4 Drawing Sheets

U.S. PATENT DOCUMENTS

| | | | |
|---|---|---|---|
| 2008/0052161 A1* | 2/2008 | Cohen et al. | 705/14 |
| 2008/0163379 A1 | 7/2008 | Robinson et al. | |
| 2008/0247542 A1* | 10/2008 | Aylward et al. | 380/201 |
| 2008/0319851 A1* | 12/2008 | Grigorovitch et al. | 705/14 |
| 2008/0320551 A1* | 12/2008 | Grigorovitch et al. | 726/1 |

FOREIGN PATENT DOCUMENTS

| | | |
|---|---|---|
| GB | 2 445 627 | 7/2008 |
| WO | 02/035324 | 5/2002 |
| WO | 2006/049420 | 5/2006 |
| WO | 2007/018936 | 2/2007 |
| WO | 2008/113959 | 9/2008 |

OTHER PUBLICATIONS http://www.technologyreview.com/Biztech/19740/?a=f, downloaded on Aug. 24, 2008.

http://www.rss-tv.org/documentation.html, downloaded on Aug. 24, 2008.

Search Report for GB0813585.7 dated Oct. 16, 2008.

* cited by examiner

DEVICE, SYSTEM, AND METHOD OF DIGITAL RIGHTS MANAGEMENT UTILIZING SUPPLEMENTAL CONTENT

CROSS-REFERENCE

This application claims priority from and the benefit of U.S. Provisional Patent application 60/935,047, entitled "System and method for providing authentication-dependent scheme driven advertisements and content", filed Jul. 24, 2007, the entire disclosure of which is incorporated herein by reference.

BACKGROUND

A Digital-Rights-Management (DRM) scheme may be implemented to restrict the utilizing, e.g., playing-back, of content, e.g., media content, for example, by forcing a user to obtain a license before being able to utilize the content.

The content to be utilized may be provided to the user as secured, e.g., encrypted, digital content. A licensing entity may provide the user with a data object, often referred to as a Rights Object (RO), e.g., in return for a payment. The RO represents the privilege of the user to utilize the content in certain ways, which may be defined by one or more restrictions and/or conditions included in the RO.

A device, also referred to as a content consumption platform, may include suitable logic, also referred to as a DRM agent, to manage the utilizing of the content based on the RO.

In one implementation, the device may store a media content data object, at least part of which may be the encrypted digital content. An encryption key for decrypting the encrypted digital content may be stored as part of the RO. The RO may also include a data structure ("rights") defining one or more conditions under which the encrypted digital content may be utilized in certain ways. In a typical scenario, the user may purchase, or otherwise obtain, the RO, which forms the user's authorization to utilize the encrypted digital content.

In some implementations, the media content data object includes advertisement content which is incorporated, in a predefined and fixed manner, as an integral part of the media content data object, for example, as a predefined fixed and integral part of the encrypted digital content.

SUMMARY

Some embodiments include devices, systems, and/or methods of Digital Rights Management (DRM) utilizing supplemental content.

Some embodiments include causing, e.g., forcing, presentation of supplemental content of at least one supplemental content object, when secured digital content is utilized. In some embodiments, the supplemental content may include advertisement content. In some embodiments, the supplemental content object may be separate or detached from a media content object including the secured digital content.

The ability to deliver an advertisement to consumers of digital media is valuable. An advertiser may pay a media content provider, which enables the exposure of the advertisement. In some cases, the revenue stream from the advertiser may subsidize the cost of a media content data object, to the extent that the media content data object may, in some cases, be provided to individual consumers, e.g., users, free of charge.

The revenue that can be secured by the introduction of advertisement content may rely on the ability of the media content provider to incorporate the advertisement content into the media content data object. Often, it may be required to deliver the advertisement content data to the consumer by means that do not allow the consumer to eliminate the advertisement content data, e.g., while not allowing the user to utilize the media content without the user being exposed to the advertisement content data.

In some embodiments, DRM functionality may be utilized to bind the utilizing of a media content data object to the presentation of advertisement content data, which may be detached from the media content data object. In one embodiment, the advertisement content data may be modified, changed and/or replaced throughout the "lifetime" of the media content data object to which the advertisement content data corresponds.

Some embodiments include an apparatus, which includes a DRM agent to manage the utilizing of a content object including secured, e.g., encrypted, digital content based on a rights object related to the content object, wherein based on at least one restriction defined in the rights object, the agent is to cause the apparatus to present supplemental content of at least one supplemental content object when the content object is utilized.

In some embodiments, the restriction relates to at least one group object including at least one reference to the at least one supplemental content object, respectively; and the reference includes identification information to identify the supplemental content object.

In some embodiments, the reference includes one or more presentation conditions restricting the presentation of the supplemental content; and the DRM agent is to cause the apparatus to selectively present the supplemental content based on the presentation conditions.

In some embodiments, the presentation conditions include at least one of a timing condition defining one or more allowed time periods to present the supplemental content, and a count condition defining an allowed number of presentations of the supplemental content.

In some embodiments, the reference includes location information identifying a location of the supplemental content object. The DRM agent is to obtain the supplemental content object based on the location information.

In some embodiments, the reference includes expiration information indicating conditions for one or more expiration states of the supplemental content object.

In some embodiments, the group object includes expiration information of a current group object stored by the apparatus and location information identifying a location of an up-to-date version of the group object, wherein the agent is to replace the current version with the up-to-date version based on the expiration information.

In some embodiments, the supplemental content object includes presentation timing information, wherein the agent is to control a timing of the presentation of the supplemental content based on the presentation timing information.

In some embodiments, the supplemental content object is separate from the content object.

In some embodiments, the agent is capable of obtaining the supplemental content object prior to allowing the utilizing of the content object.

In some embodiments, the agent is to allow utilizing of the content object using the restriction only with the presentation of the supplemental content.

In some embodiments, the content object includes media content to be played back by a player application, and the agent is to cause the player application to play back the supplemental content when playing the media content.

In some embodiments, the supplemental content includes advertisement content.

Some embodiments include a DRM system, which includes a DRM server to generate a rights object restricting the utilizing of a content object including secured, e.g., encrypted, digital content, wherein the rights object includes at least one restriction to cause the presentation of supplemental content of at least one supplemental content object when utilizing the content object.

In some embodiments, the restriction relates to at least one group object including at least one reference to the at least one supplemental content object, respectively; and the reference includes identification information to identify the supplemental content object.

In some embodiments, the restriction includes group object identification information to identify the group object, and integrity verification information to verify the integrity of the group object.

In some embodiments, the system includes a device including a DRM agent to manage the utilizing of the secured digital content based on the rights object, wherein based on the restriction the DRM agent is to cause the device to present the supplemental content when the secured digital content is utilized.

In some embodiments, the supplemental content object is separate from the content object.

In some embodiments, the supplemental content includes advertisement content.

Some embodiments include a method of utilizing a content object including secured, e.g., encrypted, digital content, the method including receiving a rights object related to the content object; and based on at least one restriction in the rights object, causing the presentation of supplemental content of at least one supplemental content object when the content object is utilized.

In some embodiments, the restriction relates to at least one group object including at least one reference to the at least one supplemental content object, respectively, and the reference includes identification information to identify the supplemental content object.

In some embodiments, the reference includes one or more presentation conditions restricting the presentation of the supplemental content, wherein causing the presentation of the supplemental content includes selectively causing the presentation of the supplemental content based on the presentation conditions.

In some embodiments, the reference includes location information identifying a location of the supplemental content object, wherein the method includes obtaining the supplemental content object based on the location information.

In some embodiments, the reference includes expiration information indicating one or more expiration states of the supplemental content object.

In some embodiments, the group object includes expiration information indicating one or more expiration states of a current group object stored by the apparatus and location information identifying a location of an up-to-date version of the group object, wherein the method includes replacing the current version with the up-to-date version based on the expiration information.

In some embodiments, causing the presentation of supplemental content includes controlling a timing of the presentation of the supplemental content based on presentation timing information included in the supplemental content object.

In some embodiments, the supplemental content object is separate from the content object.

In some embodiments, the method includes obtaining the supplemental content object prior to allowing the utilizing of the content object.

In some embodiments, the method includes allowing the utilizing of the content object using the restriction only with the presentation of the supplemental content.

In some embodiments, the supplemental content includes advertisement content.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
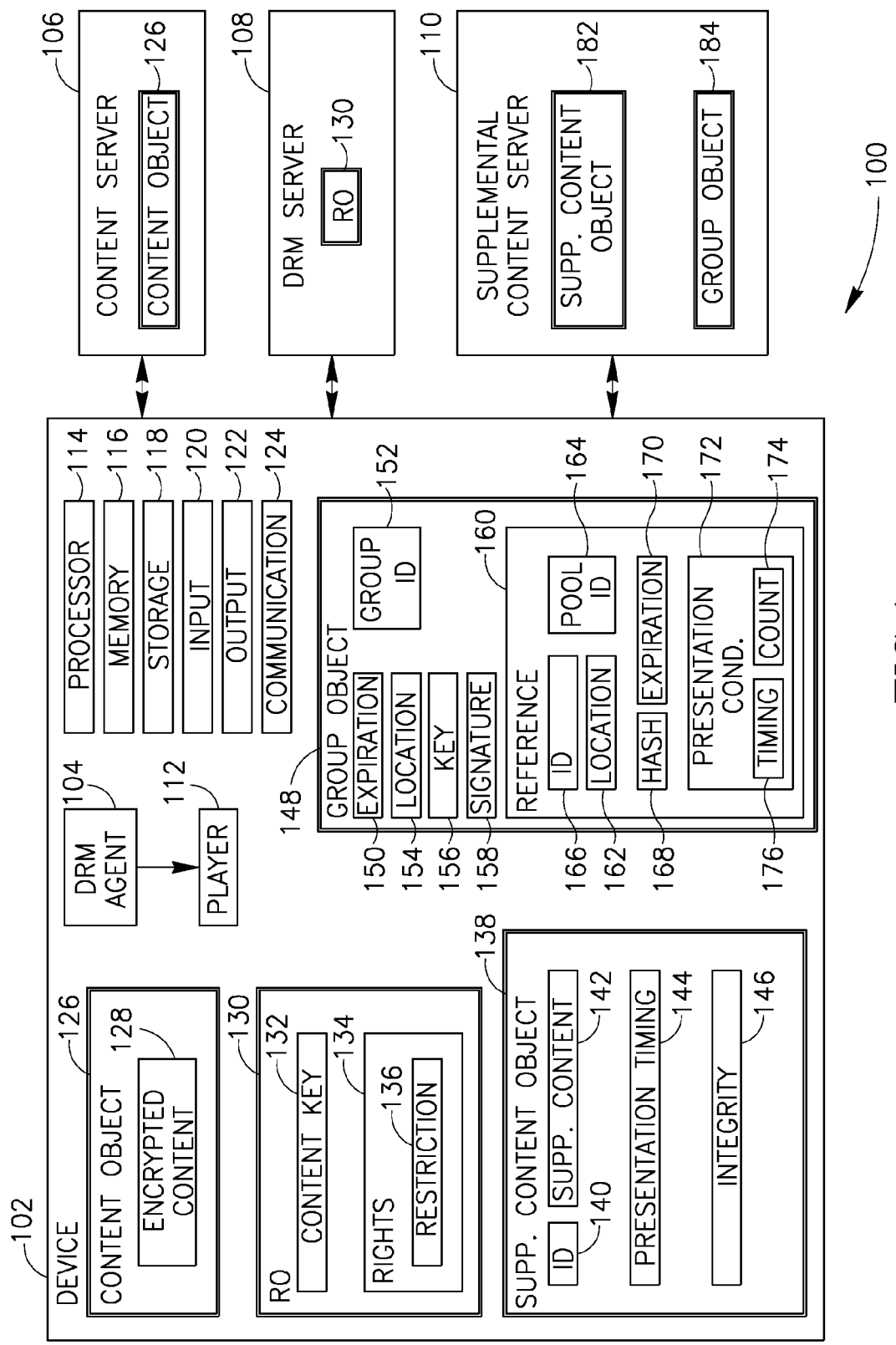
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

The term "content" as used herein includes any suitable data, information, and the like.

The term "digital content" as used herein refers to content represented by digital pulses, signals and/or values, for example, using a binary representation.

The term "secured digital content" as used herein includes digital content secured using any suitable physical and/or non-physical security and/or protection method, scheme and/or algorithm, for example, to prevent unauthorized, prohibited and/or disallowed utilizing of the digital content, e.g., as known in the art. The secured digital content may include, for example, encrypted digital content.

The term "encrypted digital content" as used herein includes digital content encrypted using any suitable encryption method, scheme and/or algorithm, e.g., as known in the art.

The term "media content" as used herein relates to any suitable audio, video, document, image, and the like, and/or any combination thereof. For example, the media content may include a music recording, a video clip, an image, and the like.

The term "presenting" as used herein with relation to content may include displaying, playing, playing back, exposing, consuming, outputting and/or providing the content in any suitable manner.

The term "supplemental content" as used herein may include any suitable content to be presented together with other content, in addition to other content, before other content, after other content, and/or with other content. The supplemental content may include, for example, media content. In one example, the supplemental content may include advertisement content. The advertisement content may include, for example, any suitable information to promote, communicate, solicit, announce, notify of, and/or encourage the use of, any suitable item, product, service, commodity, and the like. The advertisement may either by be paid for or not.

The term "utilizing" as used herein with relation to content may include consuming, displaying, playing, playing back, outputting, exposing, disclosing, using and/or providing the content in any suitable manner.

The term "utilizing" as used herein with relation to encrypted content may include decrypting the encrypted content and consuming, displaying, playing, playing back, outputting, exposing, disclosing, using and/or providing the decrypted content in any suitable manner.

Some embodiments may include one or more wired or wireless links, may utilize one or more components of wireless communication, may utilize one or more methods or protocols of wireless communication, or the like. Some embodiments may utilize wired communication and/or wireless communication.

Some embodiments include methods devices and/or systems capable of combining the presentation of secured, e.g., encrypted, digital content of a media content object, with the presentation of supplemental content of a supplemental content object, for example, in accordance with a Digital Rights Management (DRM) scheme. In some embodiments, the supplemental content object may be separate from, detached from, and/or independent of, the media content object. In one embodiment, the supplemental content may include advertisement content.

In some embodiments, the DRM scheme may be capable of enforcing presentation of the supplemental content to a user, when the user utilizes the content object and/or the secured content data, as described in detail below.

In some embodiments, a Rights Object (RO) including one or more restrictions mandating the presentation of the supplemental content may be provided to the user. The RO may be provided to the user, for example, at lower cost compared to the cost of a RO that allows the user to use the content object and/or the secured digital content without such restrictions.

In some embodiments, the supplemental content, e.g., the advertisement content, may be modified and/or replaced based on any suitable criteria. For example, upon utilizing the same media content data object, different supplemental content may automatically be presented to the user, based on a time or date at which the media content data object is utilized, and/or according to the number of times a certain advertisement was already presented to that user, e.g., as described below.

FIG. 1 schematically illustrates a block diagram of a system 100 including a device 102, in accordance with some demonstrative embodiments.

In some embodiments, device 102 may include a processor 114, a memory 116, a storage unit 118, an input unit 120, an output unit 122, a communication unit 124, and/or any other suitable component. Processor 114 includes, for example, a multi-core processor (CMP), a multiprocessor, a central processing unit (CPU), a digital signal processor (DSP), a microprocessor, a host processor, a controller, a plurality of processors or controllers, a chip, a microchip, circuitry, a logic unit, an integrated circuit (IC), an application-specific IC (ASIC), or any other suitable multi-purpose or specific processor or controller. Memory 116 includes, for example, for example, a random access memory (RAM), a dynamic RAM (DRAM), a synchronous DRAM (SD-RAM), a flash memory, a volatile memory, or other suitable memory unit. Storage unit 118 includes, for example, a hard disk drive, a floppy disk drive, a compact disk (CD) drive, a CD-ROM drive, a digital versatile disk (DVD) drive, or other suitable removable or non-removable storage units. Input unit 120 includes, for example, a keyboard, a keypad, a mouse, a touch-pad, a stylus, a microphone, or other suitable pointing device or input device. Output unit 122 includes, for example, a cathode ray tube (CRT) monitor or display unit, a liquid crystal display (LCD) monitor or display unit, a screen, a monitor, a speaker, or other suitable audio, image and/or video display or output device. Communication unit 124 includes, for example, a wired or wireless network interface card (NIC), a wired or wireless modem, a wired or wireless receiver and/or transmitter, a wired or wireless transmitter-receiver and/or transceiver, a radio frequency (RF) communication unit or transceiver, or other units able to transmit and/or receive signals, blocks, frames, transmission streams, packets, messages and/or data. Communication unit 124 may optionally include, or may optionally be associated with, for example, one or more antennas, e.g., a dipole antenna, a monopole antenna, an omni-directional antenna, an end fed antenna, a circularly polarized antenna, a micro-strip antenna, a diversity antenna, or the like.

In some embodiments, device 102 may include, or may be, a Personal Computer (PC); a desktop computer; a mobile computer; a laptop computer; a notebook computer; a tablet computer; a server computer; a handheld computer; a handheld device; a Personal Digital Assistant (PDA) device; a handheld PDA device; a Set Top Box (STB); a media-playing device, e.g., a MP3 player device, an MP4 player device, or the like; an on-board device; an off-board device; a hybrid device; a vehicular device; a non-vehicular device; a mobile or portable device; a non-mobile or non-portable device; a wireless communication station; a wireless communication device; a unit or device of a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), a two-way radio communication system, and/or a cellular radio-telephone communication system; a cellular telephone; a wireless telephone; a Personal Communication Systems (PCS) device; a PDA device which incorporates a wireless communication device; a mobile or portable Global Positioning System (GPS) device; a device which incorporates a GPS receiver or transceiver or chip; a Multiple Input Multiple Output (MIMO) device; a Single Input Multiple Output (SIMO) device, a Multiple Input Single Output (MISO) transceiver or device; a multi-standard radio device, a wired or wireless handheld device (e.g., BlackBerry, Palm Treo), a Wireless Application Protocol (WAP) device, or the like.

In some embodiments, system 100 may include an implementation of an Open Mobile Alliance (OMA) DRM system. In other embodiments, system 100 may include an implementation of any other DRM system.

In some embodiments, device 102 includes a DRM agent 104 capable of managing the utilizing of one or more instances of a content object 126 including secured content, for example, in the form of encrypted digital content 128, according to, and/or in conjunction with, one or more instances of a Rights Object (RO) 130 related to content object 126, e.g., as described below. Content object 126 may include, for example, media content, e.g., a music recording, a video clip, an image, or any other suitable content.

Although some embodiments are described herein with relation to managing the utilizing of one or more instances of a content object, e.g., content object 126, including encrypted digital content, e.g., encrypted digital content 128, it will be appreciated that other embodiments may include managing the utilizing of one or more instances of a content object including any other suitable secured digital content.

In some embodiments, DRM agent 104 may include a software application, which may be executed, for example, by processor 114 executing suitable instructions, which may be stored by memory 116 and/or storage 118. In other embodiments, DRM agent 104 may include any other suitable software and/or hardware implementation.

In some embodiments, system 100 may also include a content server 106 to provide content object 126 to device 102, e.g., which may communicate with communication unit 124 via any suitable wired and/or wireless link.

In some embodiments, system 100 may also include a DRM server 108 to generate RO 130 related to content object 126 and/or encrypted digital content 128. RO 130 may include information that causes DRM agent 104 to restrict the utilizing of content object 126 and/or encrypted digital content 128, e.g., as described in detail below.

In some embodiments, content object 126 may be a media content object including media content, and encrypted digital content 128 may include encrypted media content. In other embodiments, content object 126 and/or encrypted digital content 128 may include any other suitable digital content.

In some embodiments, RO 130 may include data representing the right of a user of device 102 to utilize, possibly under certain restrictions, content object 126. RO 130 may include, for example, rights 134 in the form of a data structure representing the restrictions under which the user may utilize the data in content object 126. In one embodiment, rights 134 may include restrictions written in the Rights Expression Language (REL) as used by OMA DRM, and/or any other suitable language or notation.

In some embodiments, RO 130 may include at least one content key 132 to decrypt encrypted digital content 128. In one embodiment, DRM agent 104 may use content key 132 to decrypt encrypted digital content 128, for example, upon assuring that content object 126 is to be utilized only according to the restrictions specified in rights 134.

In some embodiments, rights 134 may include at least one restriction 136 ("the supplemental content restriction") to cause the presentation of supplemental content 142 of at least one supplemental content object 138 when utilizing content object 126 and/or encrypted digital content 128, e.g., as described below. Based on restriction 136, DRM agent 104 may cause, for example, device 102 to present supplemental content 142 when content object 126 and/or encrypted digital content 128 is utilized. In some embodiments, DRM agent 104 may allow utilizing of encrypted content object 126 and/or digital content 128 using rights 134 only with the presentation of supplemental content 142, e.g., as described below.

In some embodiments, supplemental content object 138 and/or the media content of content object 126 may be presented using output unit 122.

In some embodiments, supplemental content object 138 may include a data structure including at least one supplemental content 142, and an identifier (ID) 140 identifying supplemental content object 138. In one embodiment, supplemental content 142 includes advertisement content, for example, a visual advertisement, an audio advertisement, an audio-visual advertisement, and/or any other suitable media content to be presented to the user of device 102, for example, when content object 126 is utilized. In one embodiment, ID 140 may include, for example, a serial number and/or a string.

In some embodiments, supplemental content object 138 may also include presentation timing information 144. Presentation timing information 144 may include, for example, one or more embedding method parameters to define a scheme for combining the presentation of supplemental content 142 with the utilizing of content object 126 and/or encrypted digital content 128. DRM agent 104 may control a timing of the presentation of supplemental content 142 based on presentation timing information 144. In one example, presentation timing information 144 may indicate that supplemental content 142 is to be presented immediately before presenting contents of content object 126 and/or encrypted digital content 128. In another example, presentation timing information 144 may indicate that supplemental content 142 is to be presented immediately after presenting contents of content object 126 and/or encrypted digital content 128. In another example, presentation timing information 144 may indicate that supplemental content 142 is to be presented at one or more instances during the presentation of contents of content object 126 and/or encrypted content 128, e.g., once every ten minutes.

In some embodiments, supplemental content object 138 may also include integrity information 146 to confirm the integrity of at least one of ID 140, supplemental content 142 and presentation timing information 144. In one embodiment, integrity information 146 may include a hash checksum, e.g., a cryptographic hash digest, and/or any other suitable integrity information.

In some embodiments, supplemental content object 138 may be detached and/or separate from content object 126. For example, supplemental content object 138 may be obtained, stored, modified, uploaded, retrieved, deleted, and/or updated independently of content object 126.

In some embodiments, system 100 may also include at least one supplemental content server 110 to provide supplemental content object 138 to device 102. For example, server 110 may communicate with communication unit 124 via any suitable wired and/or wireless link.

In some embodiments, content server 106, DRM server 108 and supplemental content server 110 may be implemented as different elements of system 100. In other embodiments, two or more of content server 106, DRM server 108 and supplemental content server 110 may be implemented as part of a common element of system 100.

In some embodiments, DRM agent 104 may obtain supplemental content object 138, e.g., by obtaining an up-to-date version 182 of content object 138 from server 110, prior to allowing the utilizing of encrypted digital content 128, and/or of content object 126, e.g., as described below.

In some embodiments, restriction 136 may be directly associated with supplemental content object 138, for example, by using ID 140. The implementation of a direct association between restriction 136 and supplemental content object 138 may require the modification and/or replacing of RO 130 if, for example, conditions for presenting supplemental content 142 are modified; and/or if supplemental content object 138 is to be replaced by another supplemental content object. The modification and/or replacing of RO 130, once in device 102, may be relatively expensive and/or inconvenient.

In some embodiments, restriction 136 may be indirectly associated with at least one supplemental content object 138 via at least one group object 148, as described in detail below. According to these embodiments, updating, replacing and/or modifying the association between restriction 136 and supplemental content object 138 may be performed by updating, modifying and/or replacing group object 148, e.g., while maintaining RO 130 unchanged. In some embodiments, device 102 may receive group object 148 from server 110, e.g., as described below. In other embodiments, device 102 may receive group object 148 from any other suitable source.

In some embodiments, one or more instances of content object 126, RO 130, supplemental content object 138, and/or group object 148 may be stored by device 102, e.g., by memory 116 and/or storage 118.

In some embodiments, group object 148 may include at least one reference 160 to at least one supplemental content object 138, respectively, wherein reference 160 includes identification information 166, e.g., matching ID 140, to identify the respective supplemental content object 138. Restriction 136 may relate to group object 148 using a group ID 152, which identifies group object 148. In one embodiment, group ID 152 may include, for example, a serial number and/or string.

In some embodiments, group object 148 may include expiration information 150 indicating one or more expiration states of group object 148. In one embodiment, expiration information 150 may indicate an absolute time and/or an elapsed time at which group object 148 is to be treated as "Stale". Additionally or alternatively, expiration information 150 may indicate an absolute time and/or an elapsed time at which group object 148 is to be treated as "Non-Fresh". DRM agent 104 may be capable of avoiding the use of "Stale" instances of group object 148; and/or attempting to obtain, e.g., as described below, an up-to-date version of an instance of group object 148, which is considered as "Non-Fresh" or as "Stale". In one embodiment, DRM agent 104 may delete an instance of group object 148, which is considered as "Stale".

In some embodiments, group object 148 may include location information 154 indicating the location of an up-to-date version 184 of group object 148. Location information 154 may include, for example, a Universal Resource Locator (URL) address of up-to-date version 184.

In some embodiments, DRM agent 104 may attempt to obtain the up-to-date version of group object 148 if, for example, expiration information 150 indicates that group object 148 should be treated as either "Stale" or "Non-Fresh".

In some embodiments, group object 148 may include authentication information, for example, a public key 156 and a signature 158, to verify the authenticity of group object 148. For example, public key 156 may include a key, which may be used to verify the authenticity of signature 158, e.g., using any suitable method, such as the Rivest Shamir Adelman (RSA) algorithm. In one embodiment, signature 158 may contain a digital signature computed over all data of group object 148 other than signature 158.

In some embodiments, reference 160 may include location information 162 identifying a location of up-to-date version 182 of supplemental content object 138. Location information 162 may include, for example, a URL address of version 182. In some embodiments, DRM agent 104 may obtain the up-to-date version of supplemental content object 138 based on location information 162, for example, if device 102 does not initially include supplemental content object 138 corresponding to reference 160, e.g., as described below.

In some embodiments, reference 160 may include hash information 168, for example, a checksum, e.g., a cryptographic hash, to verify the data included in supplemental content object 138 to which reference 160 refers. For example, DRM agent 104 may ascertain the contents of object 138 based on hash information 168. Such verification may be useful, for example, if supplemental content object 138 is obtained over an unreliable network and/or from an unreliable source.

In some embodiments, reference 160 may also include a pool ID 164. Pool ID 164 may include a value uniquely identifying a predefined logical "pool" of one or more supplemental content objects. For example, the pool may include a plurality of supplemental content objects, from which supplemental content is to be selected by DRM agent 104, e.g., as described below.

In some embodiments, reference 160 may include expiration information 170 indicating one or more expiration states of supplemental content object 138. In one embodiment, expiration information 170 may indicate an absolute time and/or a date at which supplemental content object 138 is to be treated as "expired". In one example, DRM agent 104 may permanently delete instances of supplemental content object 138, which, according to information 170, have expired.

In some embodiments, expiration information 170 may be incorporated as part of supplemental content object 138.

In some embodiments, reference 160 may include presentation conditions 172 restricting the presentation of supplemental content 142 of supplemental content object 138 to which reference 160 refers. DRM agent may cause device 102 to selectively present supplemental content 142 based on presentation conditions 172.

In one embodiment, presentation conditions 172 may include a timing condition 176 defining one or more allowed time periods, e.g., dates, weekdays and/or time ranges, to present supplemental content 142. For example, timing condition 176 may indicate that supplemental content 142 shall be presented only on Saturdays and Sundays, from 8 AM until 2 PM. Additionally or alternatively, presentation conditions 172 may include a count condition 174 defining an allowed number of times supplemental content 142 may be presented. For example, condition 174 may include the value '12' to indicate that supplemental content 142 is to be presented up to 12 times. According to this embodiment, DRM agent 104 may maintain, e.g., for each instance of supplemental content object 138, an "Impression Counter" (not shown) to store the number of times supplemental content 142 was presented. DRM agent may use the value of the impression counter to determine whether or not condition 174 is met.

In other embodiments, presentation conditions 172 may include any suitable information to define the circumstances in which supplemental content 142 is to be presented, e.g., in accordance with any suitable business model. For example, presentation conditions 172 may include "physical/spatial positioning" and/or "location" information, to define a positioning and/or location of device 102, e.g., as may be determined by any suitable Global-Positioning-System (GPS) or the like, at which the supplemental content data is to be presented. For example, physical/spatial positioning and/or location information may allow presenting different supplemental content to the user of device 102, when the user is located at different locations. Additionally or alternatively, presentation conditions 172 may include information defining a course of action to be taken by DRM agent 104, e.g., if supplemental content 142 is not presented at a particular instance. For example, presentation conditions 172 may define, e.g., for each condition, whether or not restriction 136 shall be considered as met or another supplemental content with the same pool ID shall be sought, e.g., if supplemental content 142 is determined not to be presented.

In some embodiments, DRM agent 104 processes restriction 136 and determines whether or not restriction 136 is met, e.g., as described below with reference to FIGS. 2A and 2B, for example, upon receiving a request from the user of device 102 to utilize content object 126.

In some embodiments, if the supplemental content restriction is not met, DRM agent 104 may attempt to allow the utilizing of content object 126 using another right of rights 134, e.g., which does not include restriction 136. If no such right is specified in rights 134, DRM agent 104 may refuse to allow, and/or prevent, the user of device 102 from utilizing content object 126.

In some embodiments, if the supplemental content restriction is met, DRM agent 104 determines qualified supplemental content to be presented, when content object 126 is utilized, e.g., by compiling a set of qualified supplemental content objects as described below with reference to FIGS. 2A and 2B. DRM agent 104 may allow the utilizing of content object 126, and cause device 102 to present one or more qualified supplemental content objects, when content object 126 is utilized, e.g., if the set of qualified supplemental content objects includes one or more qualified supplemental content objects; or allow the utilizing of content object 126 without presenting supplemental content, e.g., if the set of qualified supplemental content objects is empty (the set of qualified supplemental content objects includes zero qualified supplemental content objects).

In some embodiments, system 100 may also include a player application 112 capable of presenting media content, e.g., the media content of content object 126 and supplemental content 142. Player application 112 may be implemented as part of device 102 (FIG. 1), or by any suitable element external to device 102 (FIG. 1).

In some embodiments, DRM agent 104 causes player application 112 to play back the qualified supplemental contents, when playing back the media content of content object 126 (FIG. 1), e.g., as described in detail below.

Figure 2A:
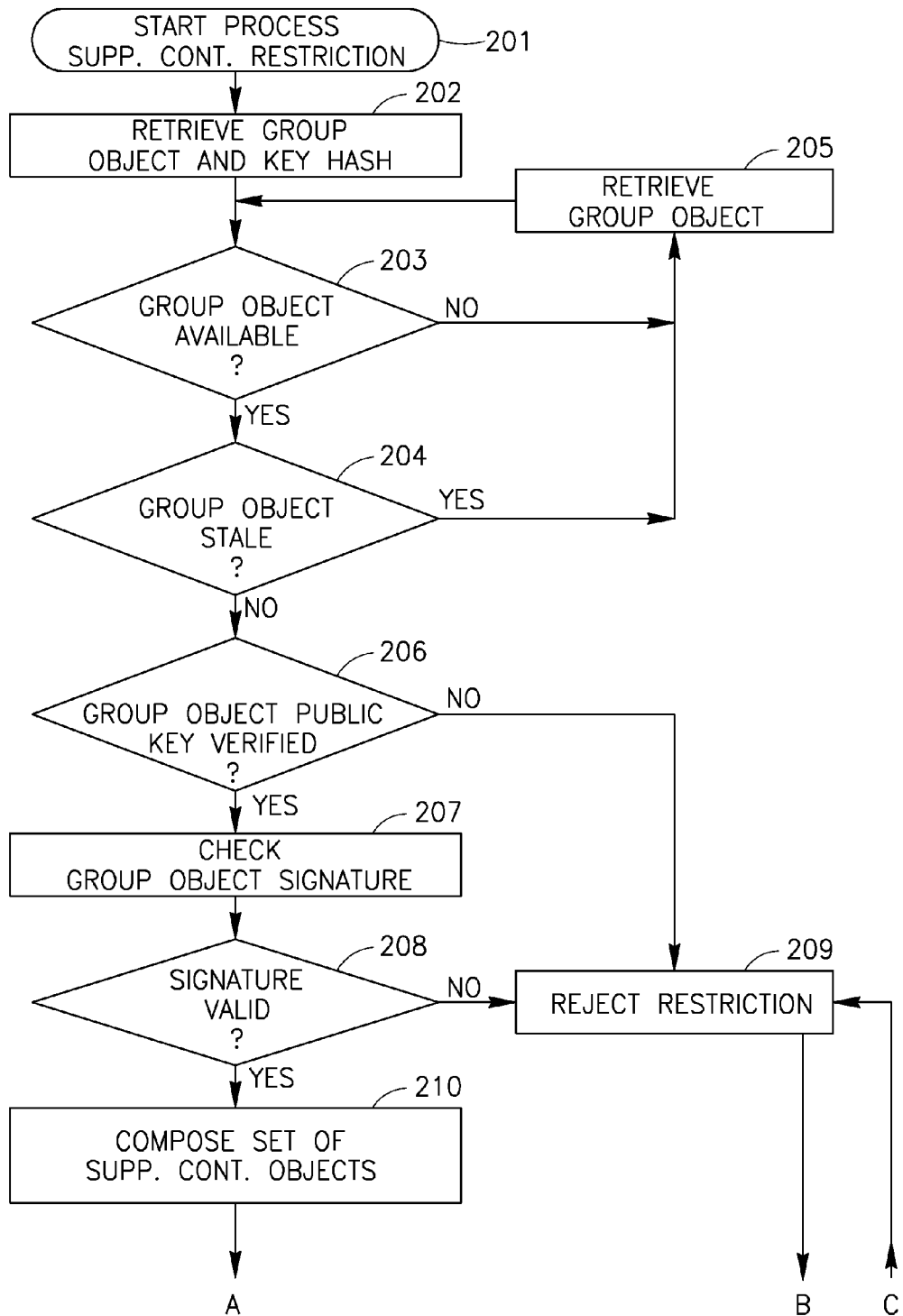
FIGS. 2A and 2B are schematic flow-chart illustrations of a method of processing a supplemental content restriction, in accordance with some demonstrative embodiments.
Figure 2B:
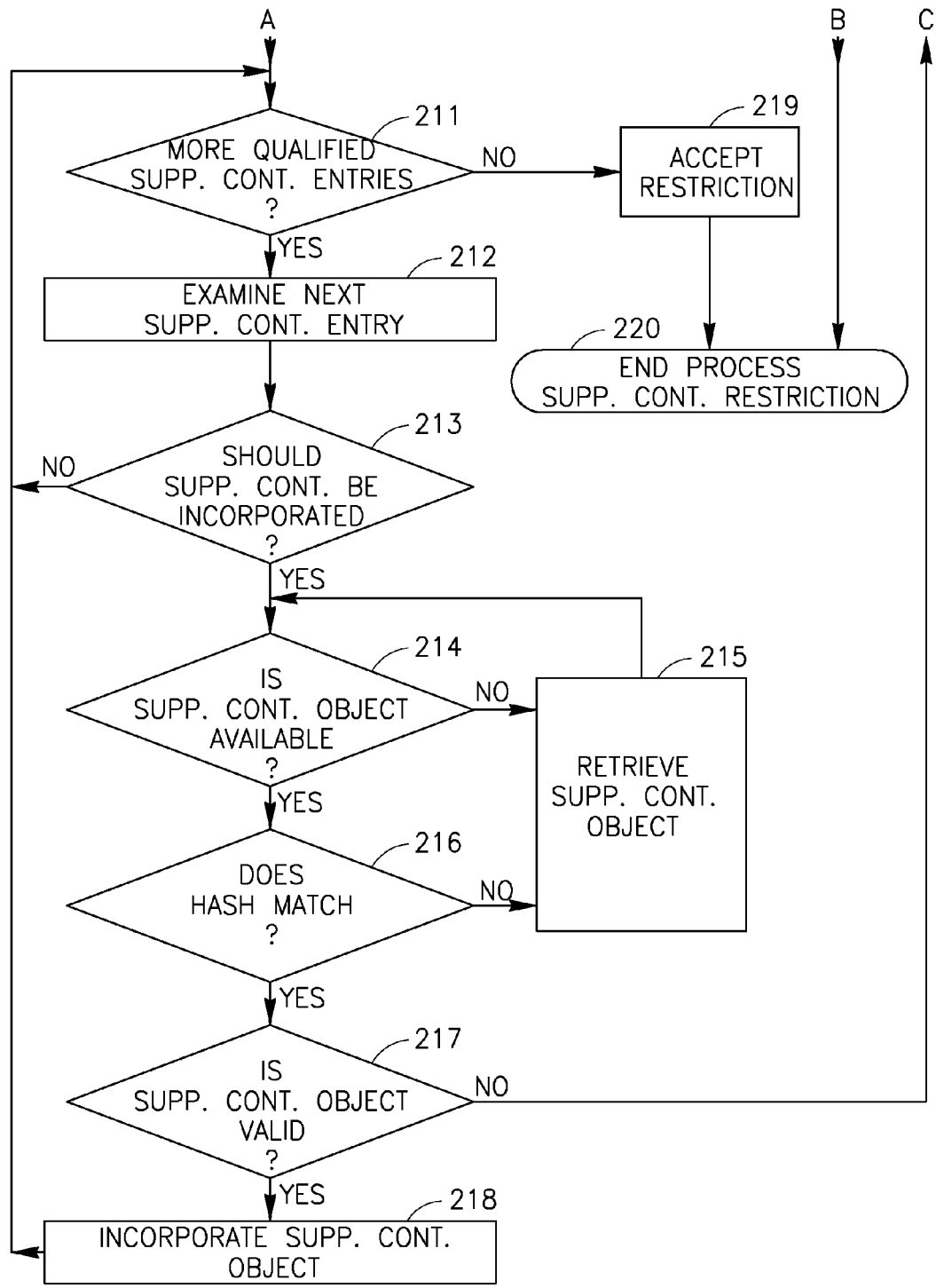

Reference is now made to FIGS. 2A and 2B, which illustrate a method of processing a supplemental content restriction, in accordance with some demonstrative embodiments. In some embodiments, one or more operations of the method of FIGS. 2A and 2B may be performed by DRM agent 104 (FIG. 1) to process a supplemental content restriction, e.g., restriction 136 (FIG. 1) of a RO, e.g., RO 130 (FIG. 1) associated with a content object, e.g., content object 126 (FIG. 1), e.g., when the user of device 102 (FIG. 1) requests to utilize encrypted digital content 128 (FIG. 1) of content object 126 (FIG. 1). In one embodiment, the supplemental content restriction may relate to the requirement to expose the user to advertisement content.

As indicated at block 201, the method may include beginning the processing of the supplemental content restriction, e.g., stated in restriction 136 (of FIG. 1), which requires the presentation of one or more instances of supplemental content, e.g., supplemental content 142 (FIG. 1).

As indicated at block 202, the method may include retrieving information referring to the one or more instances of a supplemental content object. For example, the supplemental content restriction may refer to a group object ("the referred group object"), which in turn may refer to the one or more instances of supplemental content object 138 (FIG. 1). The supplemental content restriction may include group object identification information to identify the referred group object, e.g., information which may be checked against data in group ID 152 (FIG. 1); location information that allows DRM agent 104 (FIG. 1) to retrieve the referred group object, e.g., the URL address of up-to-date version 184 of group object 148 (FIG. 1); and integrity verification information that allows DRM agent 104 (FIG. 1) to verify the integrity of the referred group object, e.g., a cryptographic hash or other form of a checksum computed over the contents of public key 156 (FIG. 1).

In some embodiments, the method may include retrieving the referred instance of group object 148, as described below.

As indicated at block 203, the method may include attempting to retrieve a locally stored instance of the referred group object. For example, DRM agent 104 (FIG. 1) may search for and determine the availability of the instance of group object 148 (FIG. 1), e.g., in a repository of device 100 (FIG. 1).

As indicated at block 205, the method may include retrieving the referred group object, for example, if the group object is not locally available. The referred group object may be retrieved, e.g., from server 110 (FIG. 1), for example, based on the location information corresponding to the referred group object, e.g., as specified in restriction 136.

In the description below, the referred to group object may be referred to as "the current group object".

As indicated at block 204, the method may include determining the state of the current group object. For example, the method may include determining whether or not the current group object is "stale", for example, using current time information in conjunction with expiration information 150 (FIG. 1). As indicated at block 205, an up-to-date version of the current group object may be retrieved, e.g., if the current group object is determined to be "stale".

In some embodiments, the method includes verifying the integrity of the current group object, e.g., as described below.

As indicated at block 206, the method may include verifying the public key of the current group object. For example, the verification information included in the supplemental content restriction may be checked against public key 156 (FIG. 1) of the current group object. Such verification may be aimed at detecting fake and/or subverted values of public key 156 (FIG. 1) in the current group object. The contents of group object 148 (FIG. 1) may be received from un-trusted sources, or through un-trusted communication bearers. This is in contrast to RO 130 (FIG. 1), which may be obtained through a secure connection. Accordingly, the authenticity of public key 156 (FIG. 1) may be ascertained by comparing a calculated hash of public key 156 (FIG. 1) to a reference value that is stored in rights 134 (FIG. 1).

As indicated at block 209, the method may include determining that the supplemental content restriction is not met ("rejecting the supplemental content restriction"), e.g., if verification of the public key of the current group object fails.

As indicated at block 220, the method may also include terminating the processing of the supplemental content restriction.

As indicated at block 207, the method may include verifying the signature of the current group object. In one example, the signature may be verified by computing a cryptographic hash on some of the contents of the current group object, and comparing the computed cryptographic hash to a value derived from carrying out a public key operation, e.g., as is known in the art, on a value of signature 158 (FIG. 1), using public key 156 (FIG. 1). Given the trustworthiness of public key 156 (FIG. 1), as ascertained above, a successful verification of the value of signature 158 (FIG. 1) may assure to an adequate level that the contents of the current group object, in whole or in part, are trustworthy and were not introduced and/or modified by an adversary.

As indicated at block 208, the method may include determining whether or not the signature of the current group object is valid. A failed verification of the signature of the current group object may result in the rejection of the supplemental content restriction, as indicated at block 209.

As indicated at block 210, the method may include composing a set of zero or more supplemental content objects ("the set of qualified supplemental content objects"), e.g., if the signature of the current group object is determined to be valid. The set of qualified supplemental content objects may be composed, for example, by reading one or more instances, e.g., all instances, of reference 160 (FIG. 1) from the current group object, e.g., as described below.

As indicated at block 211, the method may include determining whether or not there are any supplemental content entries to be processed.

As indicated at block 219, the method may include determining that the supplemental content restriction is met ("accepting the supplemental content restriction") if, for example, all supplemental content entries of the current group object have been successfully processed, e.g., as described below, and the method of FIGS. 2A and 2B has not been terminated beforehand. Upon determining that the supplemental content restriction is met, DRM agent 104 (FIG. 1) may allow the user of device 102 (FIG. 1) to utilize contents of content object 126 (FIG. 1), while causing device 102 (FIG. 1) to present appropriate supplemental content of the set of qualified supplemental content objects, optionally in accordance with any other restrictions that may apply of the restrictions specified in RO 130 (FIG. 1).

As indicated at block 212, the method may include selecting a next instance of reference entry ("the currently processed reference"), e.g., reference 160 (FIG. 1), of the current group object, e.g., if it is determined that there are one or more reference entries of the current group object to be processed.

As indicated at block 213, the method may include determining whether or not the supplemental content ("the current supplemental content") identified by the currently processed reference entry is to be incorporated as part of the set of qualified supplemental content objects. In one embodiment, such determining may include determining whether or not the current supplemental content is to be incorporated as part of the set of qualified supplemental content objects based on presentation conditions 172 (FIG. 1) and expiration information 170 (FIG. 1). For example, it may be determined that the current supplemental content is to be incorporated as part of the set of qualified supplemental content objects if, for example, timing conditions 176 (FIG. 1) and/or count conditions 174 (FIG. 1) of the currently processed reference are met.

In some embodiments, determining whether or not the current supplemental content is to be incorporated as part of the set of qualified supplemental content objects may also be based on pool ID 164 (FIG. 1). For example, only a single supplemental content object of each group of supplemental content objects having a similar value of pool ID 164 (FIG. 1) may be incorporated as part of the set of qualified supplemental content objects unless, for example, the value of pool ID 164 (FIG. 1) includes a predefined, e.g., "null", value. The single supplemental content object may be selected, e.g., randomly or pseudo randomly, from the group of supplemental content objects having the similar pool ID value.

In some embodiments, when implementing the pool ID value to select the single supplemental content object from a group of supplemental content objects, the method may include composing the set of qualified content objects, e.g., as described herein; and examining the set of qualified content objects to detect two or more supplemental content objects belonging to the same group (pool) of supplemental content objects. The method may include selecting a single supplemental content object from the two or more supplemental content objects; and removing from the set of qualified content objects the unselected supplemental content objects of the two or more supplemental content objects.

As indicated at block 214, the method may include determining the availability of a supplemental content object ("the current supplemental content object") identified by the currently processed reference, e.g., if it is determined that the current supplemental content is to be incorporated as part of the set of qualified supplemental content objects. In one embodiment, the availability of the current supplemental content object may be determined by scanning stored instances of supplemental content object 138 (FIG. 1) to detect a stored instance having a value of ID 140 (FIG. 1), which is equal to the value of ID 166 (FIG. 1) of the currently processed reference.

In some embodiments, one or more instances, e.g., all instances, of supplemental content object 138 (FIG. 1), which are referred to by one or more instances, e.g., all instances, of reference 160 (FIG. 1), in an instance of group object 148 (FIG. 1) may be obtained, e.g., from server 110 (FIG. 1), as soon as the instance of group object 148 (FIG. 1) is first obtained or updated. Such implementation may allow for a streamlined user experience when utilizing content object 126 (FIG. 1). In other embodiments, one or more instances of supplemental content object 138 (FIG. 1), reference 160 (FIG. 1), and/or group object 148 (FIG. 1), may be obtained in any other suitable manner and/or at any other suitable time.

As indicated at block 216, the method may include verifying the contents of the current supplemental content object. The verification may be implemented, for example, in order to detect instances of supplemental content object 138 (FIG. 1), which were altered by act of malice or by any error. For example, the method may include computing a cryptographic hash, or any other form of a checksum, over some or all of the data contained in the current supplemental content object. The method may also include comparing the computed hash with a value stored in hash 168 (FIG. 1) of the currently processed reference.

As indicated at block 215, the method may include retrieving the current supplemental content object, e.g., if the current supplemental content object is not available and/or the contents of the available supplemental content object are not verified. For example, DRM agent 104 may retrieve the version 182 (FIG. 1) of the current supplemental content object from server 110 (FIG. 1) based, for example, on location information 162 (FIG. 1) of the currently processed reference.

As indicated at block 217, the method may include determining whether or not the supplemental content ("the current supplemental content") of the current supplemental content object is valid for presentation, e.g., if the contents of the current supplemental content object are verified. For example, the method may include determining whether or not supplemental content 142 (FIG. 1) of the current supplemental content object can be presented, e.g., considering restrictions and technical limitations of device 102 (FIG. 1). The method may include determining that the supplemental content restriction is not met, as indicated at block 209, e.g., if the current supplemental content cannot be presented properly.

As indicated at block 218, the method may include adding the current supplemental content to the set of qualified supplemental content objects.

In some embodiments, the supplemental content restriction may be considered to be met, as indicated at block 219, e.g., if all relevant instances of reference 160 have been successfully processed; or not met, as indicated at block 209, e.g., if the group object is determined as not valid and/or if at least one of the supplemental content objects required by a relevant reference, cannot be presented, as described above.

Referring back to FIG. 1, in some embodiments, if supplemental content restriction 136 is met, DRM agent 104 may allow the utilizing of content object 126, and cause device 102 to present the supplemental content of the set of qualified supplemental content objects, when content object 126 is utilized.

In some embodiments, the set of qualified supplemental content objects may include a set of values referring to instances of supplemental content object 138, which include instances of supplemental content 142. For example, the set of qualified supplemental content objects may include a list of values matching values of ID 140 of the instances of supplemental content object 138 belonging to the set of qualified supplemental content objects.

In some embodiments, the supplemental content included in the set of qualified supplemental content objects may be presented to the user of device 102, while content object 126 is being rendered according to the request of the user. The presentation of the supplemental content may be performed by player application 112. In one embodiment, content object 126 includes media content to be played back by player application 112, and supplemental content 142 includes advertisement content. According to this embodiment, DRM agent 104 may cause player application 112 to play back the advertisement content belonging to the set of qualified supplemental content objects, when playing the media content of content object 126.

In some embodiments, DRM agent 104 may cause player application 112 to present each instance of the supplemental content 142 belonging to the set of qualified supplemental content objects based on presentation timing information 144 corresponding to each instance of the supplemental content 142. For example, the instance of supplemental content 142 may be presented before the content of content object 126 is presented, after the content of content object 126 is presented, or together with the presentation of the content of content object 126, e.g., as described above.

In some embodiments, DRM agent 104 may provide player application 112 with a set of sequential playback instructions and, based on the playback instructions, player application 112 may be capable of presenting to the user of device 102 the contents of content object 126 along with the contents of instances of supplemental content 142 belonging to the set of qualified supplemental content objects, e.g., as described below.

In some embodiments, each instance of the set of playback instructions may instruct player application 112 to present to the user of device 102 with either one of an instance of supplemental content 142, e.g., including advertisement content, or a suitable part of content object 126. DRM agent 104 may arrange the set of playback instructions, such that player application 112 may present a combination of digital content from content object 126 and the one or more instances of supplemental content 142 belonging to the set of qualified supplemental content objects, in accordance with presentation timing information 144 of the one or more instances of supplemental content 142. In the example, in which supplemental content 142 includes advertisement content, DRM agent 104 may provide the set of playback instructions to cause player application 112 to present a combination of encrypted digital content 128 and one or more advertisements, in accordance with timing information 144.

In some embodiments, each of the playback instructions in the set of playback instructions may include a reference to content to be presented by player application 112. In one embodiment, the playback instruction may include a reference to either one of part or all of an instance of content object 126, and an instance of supplemental content 142 or an instance of supplemental content object 138.

In some embodiments, the playback instruction may also include a supplemental content indicator, e.g., in the form of an indication bit ("Ad-Bit"), to indicate whether the content to be presented includes of part or all of content object 126 or supplemental content 142. In some embodiments, upon detecting the Ad-Bit in a playback instruction, e.g., indicating that supplemental content 142 is to be presented, player application 112 may be capable of presenting a predefined user-interface to the user of device 102, e.g., a user interface different from a user interface, which may be presented to the user of device 102 when presenting media content of content object 126. For example, player application 112 may prevent the user from skipping the presentation of the supplemental content, e.g., by providing a user interface not allowing fast-forwarding playback; and/or player application 112 may prevent the user from altering one or more parameters affecting the presentation of the supplemental content, e.g., by providing a user interface not allowing the user to control the audio and/or display parameters, e.g., minimizing the display and/or muting or reducing the volume.

In some embodiments, the playback instruction may optionally include indications of start and stop positions related to the content referred by the playback instruction, e.g., if a portion of the referred content is to be presented.

In some embodiments, player application 112 may follow each instance of the set of playback instructions and follow to the next instance. In one embodiment, upon completing the presentation of content referred to by a playback instruction, player application 112 may indicate to DRM Agent 104 that the content has been successfully presented, and that player application 112 is ready to receive the next playback instruction.

In another embodiment, DRM agent 104 may provide two or more playback instructions, e.g., the entire set of playback instructions, to player application 112; and player application 112 may provide an indication to DRM agent upon completing the presentation of the contents referred to by the sequence of the two or more playback instructions, e.g., upon completing the presentation of the contents referred to by the entire set of playback instructions.

Figure 3:
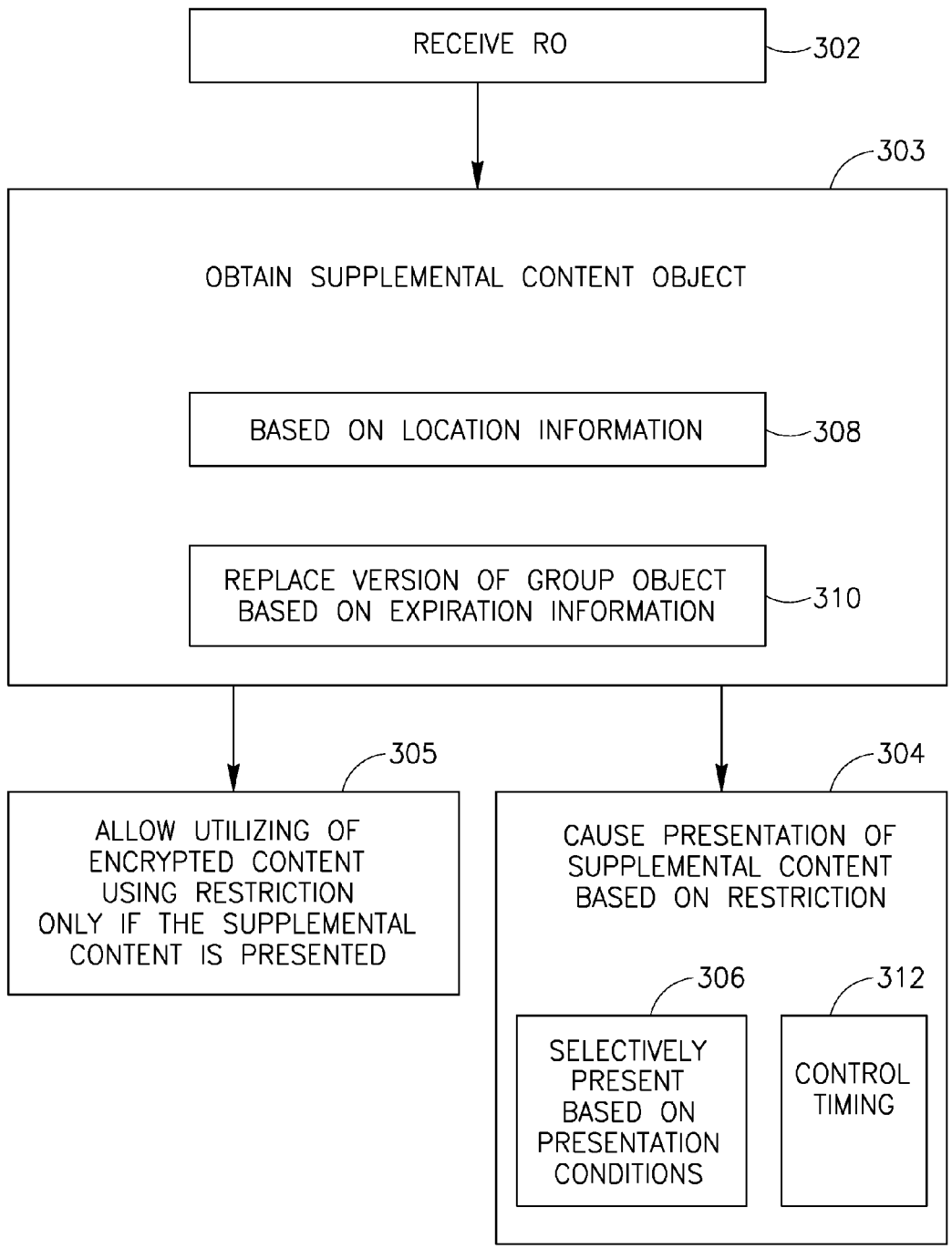
FIG. 3 is a schematic illustration of a method of digital-rights-management, in accordance with some demonstrative embodiments.

FIG. 3 is a schematic illustration of a method of digital-rights-management, in accordance with some demonstrative embodiments. In one embodiment, one or more operations of the method of FIG. 3, may be performed by one or more elements of a DRM system, e.g., system 100 (FIG. 1), a device, e.g., device 102 (FIG. 1), and/or a DRM agent, e.g., DRM agent 104 (FIG. 1).

As indicated at block 302, the method may include receiving a rights object related to a content object including secured digital content, e.g., encrypted digital content. For example, device 100 (FIG. 1) and/or DRM agent 104 (FIG. 1) may receive RO 130 (FIG. 1), as described above.

As indicated at block 304, the method may include causing, based on at least one restriction in the rights object, the presentation of supplemental content of at least one supplemental content object when the content object and/or the secured digital content is utilized. For example, DRM agent 104 (FIG. 1) may cause device 100 (FIG. 1) and/or player application 112 (FIG. 1) to present supplemental content 142 (FIG. 1) of one or more instances of supplemental content object 138 (FIG. 1), based on supplemental content restriction 136 (FIG. 1), e.g., as described above.

As indicated at block 303, the method may include obtaining the supplemental content object prior to allowing the utilizing of the content object and/or secured digital content. For example, DRM agent 104 (FIG. 1) may obtain one or more instances of supplemental content object 138 (FIG. 1) and/or group object 148 (FIG. 1) associated with restriction 136 (FIG. 1), prior to allowing the utilizing of content object 126 (FIG. 1) and/or encrypted digital content 128 (FIG. 1), e.g., as described above.

In some embodiments, the supplemental content object may be separate from the content object including the secured digital content. For example, supplemental content object 142 (FIG. 1) may be separate from content object 126 (FIG. 1), e.g., as described above.

In some embodiments, the supplemental content may include advertisement content, e.g., as described above.

In some embodiments, the restriction relates to at least one group object including at least one reference to the at least one supplemental content object, respectively, and the reference includes identification information to identify the supplemental content object, e.g., as described above with reference to group object 148 of FIG. 1.

In some embodiments, the group object includes expiration information of the current group object stored by the apparatus and location information identifying a location of an up-to-date version of the group object. As indicated at block 310, the method may include replacing the current version with the up-to-date version based on the expiration information. For example, DRM agent 104 (FIG. 1) may replace the current version of group object 148 (FIG. 1) based on expiration information 150 (FIG. 1), e.g., as described above.

As indicated at block 308, the method may include obtaining the supplemental content object based on location information included in the reference. For example, DRM agent 104 (FIG. 1) may obtain supplemental content object 138 (FIG. 1) based on location information 162 (FIG. 1) of the instance of reference 160 (FIG. 1) corresponding to supplemental content object 138 (FIG. 1), e.g., as described above.

As indicated at block 305, the method may include allowing the utilizing of the content object and/or the secured digital content using the restriction only with the presentation of the supplemental content. For example, DRM agent 104 (FIG. 1) may allow the utilizing of content object 126 (FIG. 1) and/or of encrypted digital content 128 (FIG. 1) using the right of RO 130 (FIG. 1) including restriction 136 (FIG. 1) only with the presentation of supplemental content 142 (FIG. 1) associated with restriction 136 (FIG. 1), e.g., as described above.

As indicated at block 306, causing the presentation of the supplemental content may include selectively causing the presentation of the supplemental content based on presentation conditions included in the reference. For example, DRM agent 104 (FIG. 1) may selectively cause the presentation of supplemental content 142 (FIG. 1) based on presentation conditions 172 (FIG. 1) of the instance of reference 160 (FIG. 1) corresponding to supplemental content object 138 (FIG. 1), e.g., as described above.

As indicated at block 312, causing the presentation of the supplemental content may include controlling a timing of the presentation of the supplemental content based on presentation timing information included, e.g., in the supplemental content object. For example, DRM agent 104 (FIG. 1) may control the timing of the presentation of supplemental content 142 (FIG. 1) based on presentation timing information 144 (FIG. 1), e.g., as described above.

Some embodiments, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:
1. An apparatus comprising:
a digital-rights-management (DRM) agent to manage the utilizing of a content object including secured digital content based on a rights object (RO) related to said content object,
wherein based on at least one restriction defined in said rights object (RO), said DRM agent is to cause said apparatus to present supplemental content of at least one supplemental content object when said content object is utilized, wherein said restriction relates to at least one group object (GO) including at least one reference to said at least one supplemental content object, respectively, wherein said reference includes identification information to identify said supplemental content object, wherein the group object (GO) is distinct from said rights object (RO), wherein the DRM agent is to obtain the rights object (RO) at a first time, and to obtain the group object (GO) at a second time, wherein, subsequent to a modification of content of the group object (GO), to which the rights object (RO) points, the DRM agent is to utilize the modified content of the group object (GO) while the rights object (RO) is maintained unmodified, wherein the apparatus is implemented by utilizing at least a hardware component.

2. The apparatus of claim 1, wherein the DRM agent is (a) to retrieve from the rights object (RO) an ID of the group object (GO); to check whether the group object (GO) is up-to-date;

(b) if the group object (GO) is not up-to-date, to obtain from a remote location an updated version of the group object (GO);

(c) to check authentication information of the group object (GO); and (d) to determine, based on the content of the group object (GO), which supplemental content is to be presented.

3. The apparatus of claim 2, wherein said reference includes one or more presentation conditions restricting the presentation of said supplemental content, and wherein said DRM agent is to cause said apparatus to selectively present said supplemental content based on said presentation conditions.

4. The apparatus of claim 3, wherein said presentation conditions comprise at least one of:

a timing condition defining one or more allowed time periods to present said supplemental content, and a count condition defining an allowed number of presenting said supplemental content.

5. The apparatus of claim 2, wherein said reference includes location information identifying a location of said supplemental content object, and wherein said DRM agent is to obtain said supplemental content object based on said location information.

6. The apparatus of claim 5, wherein said reference further includes expiration information indicating one or more expiration states of said supplemental content object.

7. The apparatus of claim 2, wherein said group object (GO) includes expiration information of a current group object stored by said apparatus and location information identifying a location of an up-to-date version of said group object (GO), and wherein said DRM agent is to replace said current version with said up-to-date version based on said expiration information.

8. The apparatus of claim 1, wherein said supplemental content object comprises presentation timing information, and wherein said DRM agent is to control a timing of the presentation of said supplemental content based on said presentation timing information.

9. The apparatus of claim 1, wherein said supplemental content object is separate from said content object.

10. The apparatus of claim 1, wherein said DRM agent is to obtain said supplemental content object prior to allowing the utilizing of said content object.

11. The apparatus of claim 1, wherein said DRM agent is to allow utilizing of said content object using said restriction only with the presentation of said supplemental content;

wherein the group object (GO) comprises data utilized by the DRM agent for verifying the authenticity of the supplemental content.

12. The apparatus of claim 1, wherein said content object comprises media content to be played back by a player application, and wherein said DRM agent is to cause said player application to play back said supplemental content when playing said media content.

13. The apparatus of claim 1, wherein said supplemental content comprises advertisement content;

wherein authentication information of the group object (GO) comprises a public key and a signature;

wherein the rights object (RO) comprises at least one of: a copy of the public key of the group object (GO), a hash value of the public key of the group object (GO), and a checksum value of the public key of the group object (GO).

14. A digital-rights-management (DRM) system comprising:

a DRM server to generate a rights object (RO) restricting the utilizing of a content object including secured digital content, wherein said rights object (RO) includes at least one restriction to cause the presentation of supplemental content of at least one supplemental content object when utilizing said content object, wherein said restriction relates to at least one group object (GO) including at least one reference to said at least one supplemental content object, respectively, wherein said reference includes identification information to identify said supplemental content object, wherein the group object (GO) is distinct from said rights object (RO), wherein the rights object (RO) is obtained at a first time, and wherein the group object (GO) is obtained at a second time, wherein content of the group object (GO) is modifiable while the rights object (RO), which points to said group object (GO), is maintained unmodified, wherein the DRM system is implemented by utilizing at least a hardware component.

15. The DRM system of claim 14, wherein the DRM system further comprises a device having a DRM agent, wherein the DRM agent is to retrieve from the rights object (RO) an ID of the group object (GO); to check whether the group object (GO) is up-to-date; if the group object (GO) is not up-to-date, to obtain from a remote location an updated version of the group object (GO); to check authentication information of the group object (GO); and to determine, based on the content of the group object (GO), which supplemental content is to be presented.

16. The DRM system of claim 15, wherein said restriction includes group object (GO) identification information to identify said group object (GO), and integrity verification information to verify the integrity of said group object (GO).

17. The DRM system of claim 14, wherein the DRM agent is to manage the utilizing of said content object based on said rights object (RO), wherein based on said restriction said DRM agent is to cause said device to present said supplemental content when said content object is utilized.

18. The DRM system of claim 14, wherein said supplemental content object is separate from said content object;

wherein the group object (GO) comprises data utilized by the DRM agent for verifying the authenticity of the supplemental content.

19. The DRM system of claim 14, wherein said supplemental content comprises advertisement content;
wherein authentication information of the group object (GO) comprises a public key and a signature;
wherein the rights object (RO) comprises at least one of: a copy of the public key of the group object (GO), a hash value of the public key of the group object (GO), and a checksum value of the public key of the group object (GO).

20. A method of utilizing a content object including secured digital content, the method comprising:
receiving a rights object (RO) related to said content object; and
based on at least one restriction in said rights object (RO), causing the presentation of supplemental content of at least one supplemental content object when said content object is utilized,
wherein said restriction relates to at least one group object (GO) including at least one reference to said at least one supplemental content object, respectively,
wherein said reference includes identification information to identify said supplemental content object,
wherein the group object (GO) is distinct from said rights object (RO),
wherein the rights object (RO) is obtained at a first time, and the group object (GO) is obtained at a second time,
wherein content of the group object (GO) is modifiable while the rights object (RO), which points to said group object (GO), is maintained unmodified,
wherein the method is to be performed by an electronic device comprising at least a hardware component.

21. The method of claim 20, further comprising:
retrieving from the rights object (RO) an ID of the group object (GO);
checking whether the group object (GO) is up-to-date;
if the group object (GO) is not up-to-date, obtaining from a remote location an updated version of the group object (GO);
checking authentication information of the group object (GO); and
determining, based on the content of the group object (GO), which supplemental content is to be presented.

22. The method of claim 21, wherein said reference further includes one or more presentation conditions restricting the presentation of said supplemental content, and wherein causing the presentation of said supplemental content comprises selectively causing the presentation of said supplemental content based on said presentation conditions.

23. The method of claim 21, wherein said reference further includes location information identifying a location of said supplemental content object, and wherein the method comprises obtaining said supplemental content object based on said location information.

24. The method of claim 21, wherein said group object (GO) includes expiration information of a current group object (GO) stored by said apparatus and location information identifying a location of an up-to-date version of said group object (GO), and wherein the method comprises replacing said current version with said up-to-date version based on said expiration information.

25. The method of claim 20, wherein said supplemental content object is separate from said content object.

26. The method of claim 20, comprising:
obtaining said supplemental content object prior to allowing the utilizing of said content object;
wherein the group object (GO) comprises data utilized by the DRM agent for verifying the authenticity of the supplemental content.

27. The method of claim 20, comprising:
allowing the utilizing of said content object using said restriction only with the presentation of said supplemental content.

28. The method of claim 20, wherein said supplemental content comprises advertisement content;
wherein authentication information of the group object (GO) comprises a public key and a signature;
wherein the rights object (RO) comprises at least one of: a copy of the public key of the group object (GO), a hash value of the public key of the group object (GO), and a checksum value of the public key of the group object (GO).

* * * * *